(12) United States Patent
Merkin

(10) Patent No.: US 7,107,455 B1
(45) Date of Patent: Sep. 12, 2006

(54) COMPUTER INFORMATION ACCESS BASED ON A TRANSMITTED IDENTIFICATION SIGNAL

(75) Inventor: Cynthia M. Merkin, Georgetown, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/434,770

(22) Filed: Nov. 4, 1999

(51) Int. Cl.
*H04L 9/32* (2006.01)

(52) U.S. Cl. .................... 713/182; 713/185
(58) Field of Classification Search ............ 713/200, 713/182, 185, 186, 168, 176; 455/410, 411
See application file for complete search history.

(56) References Cited

U.S. PATENT DOCUMENTS

| | | | |
|---|---|---|---|
| 4,159,530 A | 6/1979 | Raimond et al. ............ 364/900 |
| 4,926,480 A | 5/1990 | Chaum ......................... 380/23 |
| 5,440,109 A | 8/1995 | Hering et al. ............... 235/384 |
| 5,578,991 A | 11/1996 | Scholder ..................... 340/571 |
| 5,659,800 A | 8/1997 | Zhang et al. ............... 395/882 |
| 5,757,271 A | 5/1998 | Andrews ..................... 340/568 |
| 5,781,408 A | 7/1998 | Crane, Jr. et al. ........... 361/683 |
| 5,793,309 A | 8/1998 | Nellson ................... 340/932.2 |
| 5,805,880 A | 9/1998 | Pearce et al. ............... 395/652 |
| 5,841,120 A | 11/1998 | Bouthillier et al. ......... 235/382 |
| 5,877,483 A | 3/1999 | Bilich et al. ................ 235/382 |
| 5,894,552 A | 4/1999 | Bouthillier et al. .... 395/187.01 |
| 5,926,103 A | 7/1999 | Petite .................... 340/825.19 |
| 5,960,085 A * | 9/1999 | de la Huerga ............. 340/5.61 |
| 6,108,785 A * | 8/2000 | Poisner ........................ 726/20 |
| 6,181,803 B1 * | 1/2001 | Davis ......................... 382/115 |
| 6,360,326 B1 * | 3/2002 | Hiles .......................... 726/19 |

OTHER PUBLICATIONS

Clint O'Connor and Erica Scholder; "*Mouse With Security Feature*"; U.S. Appl. No. 08/914,948; filed Aug. 20, 1997.
John Barret; "*A Security Management Tool For Managing Security Attriibutes In Computer Systems*"; U.S. Appl. No. 09/342,695; filed Jun. 29, 1999.
La Vaughn R. Watts, Jr. and James E. Dailey; "*Portable Computer System With Hierarchical And Token-Based Security Policies*"; U.S. Appl. No. 09/237,016; filed Jan. 25, 1999.
Muhammed Jaber; "*System And Method For Securing A Computer System*"; U.S. Appl. No. 09/237,735; filed Jan. 26, 1999.
James E. Dailey and Muhammed Jaber; "*System And Method For Securing A Computer System*"; U.S. Appl. No.: 09/317,233; filed May 24, 1999.

(Continued)

*Primary Examiner*—Matthew Smithers
(74) *Attorney, Agent, or Firm*—Haynes and Boone, LLP

(57) ABSTRACT

A system for restricting access to computer information accessible by a computer system. A computer system having access to computer information includes a detection circuit for receiving a wireless identification signal from a transmitting circuit of an identification object such as an identification badge. The identification signal includes identification information regarding the assigned possessor of the security object. In one embodiment, the detection circuit determines whether the assigned possessor of the security object as indicated by the wireless identification signal has authorized access to computer information accessible by the computer system. A user is given access if the identification information contained in the identification signal indicates that the assigned possessor is an authorized user. The computer system is placed in a condition to deny access to computer information accessible by the computer system in response to the identification signal detection circuit not having received for a predetermined period of time, a wireless identification signal containing identification information from an assigned possessor having authorized access.

15 Claims, 3 Drawing Sheets

OTHER PUBLICATIONS

Michael T. Collins and Damon W. Broder; *"System And Method For Securing A Computer System"*; U.S. Appl. No. 09/291,540; filed Apr. 14, 1999.

Dirie Herzi; *"Network Controlled Mobile Notebook Security"*; U.S. Appl. No. 09/237,637; filed Jan. 26, 1999.

Gemplus; "Microprocessor Cards"; Sep. 22, 1999; http://www.gemplus.com/products/microprocessors/gemx.htm.

Gemplus; *"Information Technology"*; Sep. 22, 1999; http://gemplus.com/app/it/netsecurity.htm.

Gemplus; "What is a Smart Card"; Sep. 22, 1999; http://www.gemplus.com/basics/what.htm.

Gemplus; "Why is a Smart Card Secure"; Sep. 22, 1999; http://www.gemplus.com/basics/why.htm.

Gemplus; "Smart Card Terms"; Sep. 22, 1999; http://www.gemplus.com/basics/terms.htm.

Gemplus; "What is a Smart Card—Radio Frequency Indentification Systems"; Sep. 22, 1999; http://www.gemplus.com/basics/tag.htm.

Gemplus; "What is a Smart Card—The Future"; Sep. 22, 1999; http://www.gemplus.com/basics/future.htm.

Gemplus; "Smart Card Basics"; Sep. 22, 1999; http://www.gemplus.com/basics/index.htm.

Gemplus; "Microprocessor Cards—GemXplore98"; Sep. 22, 1999; http://www.gemplus.com/products/microprocessor/gemxplore.htm.

Gemplus; "Microprocessor Cards—GemXpressorRAD"; Sep. 22, 1999; http://www.gemplus.com/products/microprocessor/gemxpresso.htm.

Gemplus; "Software—GemSAFE Enterprise"; Sep. 22, 1999; http://www.gemplus.com/products/software/gemsafe/index.htm.

Gemplus; "Closed Environments—Smart Cards for Closed Environments"; Sep. 22, 1999; http://www.gemplus.com/app/closedsys/index.htm.

Gemplus; "Closed Environments—Produts"; Sep. 22, 1999; http://www.gemplus.com/app/closedsys/products.htm.

Gemplus; "Contactless Cards—GemEasy 8000"; Sep. 22, 1999; http://www.gemplus.com/products/contactless/gemeasy8,000.htm.

Gemplus; "Hardware—GemAccess608"; Sep. 22, 1999; http://www.gemplus.com/products/hardware/gemaccess.htm.

Gemplus; "R&D—The Future of Information Systems"; Sep. 22, 1999; http://www.gemplus.com/smart/r_d/trends/index.htm.

Bluetooth; "Document/Overview"; Sep. 13, 1999; http://www.bluetooth.com/document/default.asp?page=overview.

Rainbow Technologies: "CardTerm—Smart Card Reader"; Sep. 13, 1999; http://www.rainbow.com/products/CardTerm/cardterm.html.

Bluetooth Specification Version 1.0 A; "Radio Specification"; Jul. 24, 1999, pp. 19-21.

Bluetooth Specification vol. 1; "Specification of the Bluetooth System"; Jul. 26, 1999 pp. 1-32., Part A Radio Specification.

Terry L. Matula and John R. Stuewe; *"Prevention Of Power State Change In Response To Chassis Intrusion"*; U.S. Appl. No. 09/322,296; filed May 28, 1999.

\* cited by examiner

COMPUTER INFORMATION ACCESS BASED ON A TRANSMITTED IDENTIFICATION SIGNAL

BACKGROUND

This disclosure relates to controlling the access of computer information accessible by a computer system.

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and peripheral devices that provide input and output for the system. Such peripheral devices may include display monitors, keyboards, mouse-type input devices, floppy and hard disk drives, CD-ROM drives, printers, network capability card circuits, terminal devices, modems, televisions, sound devices, voice recognition devices, electronic pen devices, and mass storage devices such as tape drives, CD-R drives, or DVDs.

Both individuals and organizations utilize computer systems to provide access to computer information. The computer information accessible by a computer system may be stored in the computer system such as in a hard disk drive or accessible by the computer system via a computer network or a peripheral device. Consequently, it is desirable to restrict access to that information. Past techniques of controlling access include utilizing passwords for logging on to a computer system or network. Another technique for determining authorized access includes utilizing smart card readers (e.g., magnetic or optical) to read smart cards or other physical objects that include encoded identification information. An example of such a system can be found in Bilich et al., U.S. Pat. No. 5,877,483, entitled "Method and Apparatus for Automatically Implementing Computer Power On and Logon Functions Using Encoded ID Card," having a common Assignee, which is hereby incorporated by reference in its entirety. Another example can be found in Bouthillier et al., U.S. Pat. No. 5,894,552, which is hereby incorporated by reference in its entirety. Other examples techniques for controlling access are found in a patent application entitled "Portable Computer System With Hierarchical and Token-Based Security Policies, Ser. No. 09/237,016, and having a common Assignee, which is hereby incorporated by reference in its entirety.

Other techniques for determining whether a user has authorized access include the utilization of biometric identification such as by the analysis of fingerprints, eye, or voice patterns. An example of such a system can be found in U.S. Pat. No. 5,838,306, entitled "Mouse With Security Feature," having an issue date of Nov. 17, 1998, listed inventors Clint O'Conner and Erica Scholder, and a common Assignee, all of which is hereby incorporated by reference in it's entirety.

A common feature of the techniques utilizing smart cards or other types of identifying objects that contain identification information is that they require a user desiring access to the computer information to perform a conscious access action to provide the identification information to the card reader to gain access. For example, with a smart card, the user must purposefully and consciously insert the object into the reader or directly bring the object within the scanning field of the reader. Such a conscious access action provides a delay in gaining access to the computer system. Also such a system may require the user to physically move the object from its normal storage position on the user's body (e.g., from a shirt pocket, belt clip, or from around a user's neck, as with a necklace) to the location of the reader. Not only is such a motion inconvenient, but it also increases the risk that the object may not be returned to its normal storage position. For example, after inserting a smart card into a reader, a user may leave the smart card on their desk by the computer system.

SUMMARY

It has been discovered that a wireless identification signal sent by an identification object can be utilized in controlling access to computer information accessible by a computer system. One advantage of such a system is that it can be configured to place the computer system in a higher power state from a lower power state without requiring the performance of a conscious access action of a user, thereby reducing the amount of time required for logging onto the system. Another advantage is that the system can be configured to deny access to computer information accessible by the computer system when the identification signal has not been received for a predetermined period of time.

In one aspect, the disclosure includes a computer system having at least one processor and an identification signal detection circuit for receiving a wireless identification signal from an identification object. The wireless identification signal contains identification information regarding the assigned processor of the identification object. The computer system also includes a memory having means for determining whether the assigned possessor of the identification object as indicated by the wireless identification signal has authorized access to computer information accessible by the computer system. The computer system further includes a memory having means for determining that the identification signal detection circuit has not received for a predetermined period of time, a wireless identification signal containing identification information from an assigned possessor having authorized access.

In another aspect, the disclosure includes a method for controlling access to computer information. The method includes sending a wireless identification signal by an identification object. The wireless identification signal includes identification information regarding an assigned possessor of the object. The method includes receiving, independent of a conscious access action by a user, the wireless identification signal by a detection circuit. The method further includes determining whether the assigned possessor as indicated by the wireless identification signal has authorized access to computer information accessible by a computer system. The method still further includes granting access to computer information accessible by the computer system if determined that the assigned possessor as indicated by the wireless identification signal is authorized access.

In another aspect, an identification object for an assigned possessor includes a circuit having a controller, an antennae, and a memory operably coupled to the connector. The memory has means for generating an information signal periodically broadcast via the antennae. The information signal contains identification information regarding the assigned possessor.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates identical items.

DETAILED DESCRIPTION

The following sets forth a detailed description of a mode for carrying out the embodiments. The description is intended to be illustrative of the disclosure and should not be taken to be limiting.

Figure 1:
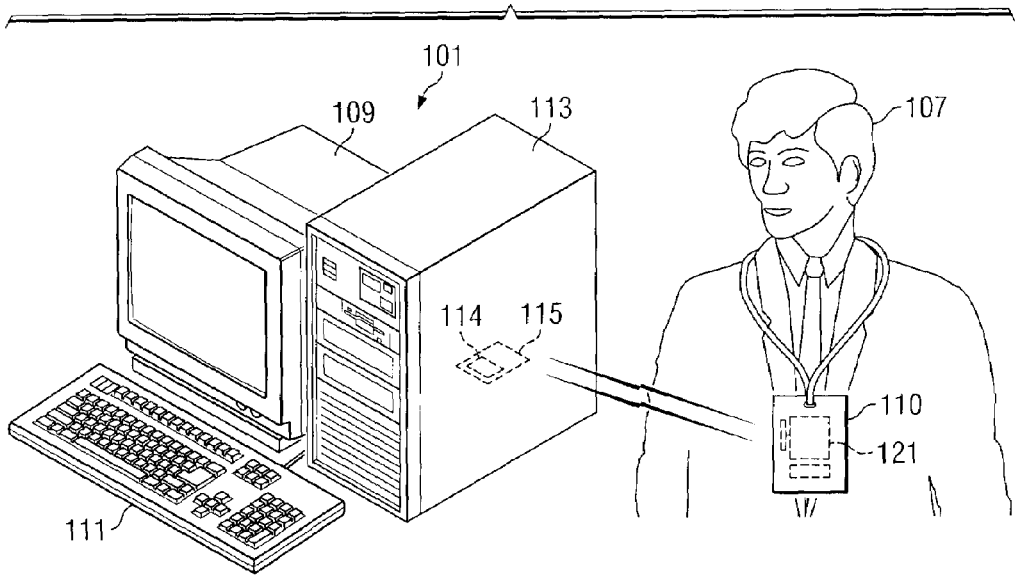
FIG. 1 is a perspective view of one example of a computer system and an identification object.

FIG. 1 is a perspective view of an example of a computer system and an identification object. Computer system 101 is a personal computer that includes a stand alone chassis 113, a monitor 109, and a keyboard 111. Computer system 101 can provide a user access to computer information such as, e.g., computer information stored in a hard disk drive (481 in FIG. 4) installed in chassis 113, or stored in other computer systems accessible by computer system 101 over a network (not shown) such as a local area network or a wide area network.

Computer system 101 includes an identification signal detection circuit 114 that is utilized to control user access to computer information accessible by computer system 101. User access to the computer information is enabled when detection circuit 114 receives a wireless signal containing identification information of a user having authorized access to the computer information. Detection circuit 114 is shown in FIG. 1 mounted on an add-in card 115 in chassis 113. However, with other computer systems, a detection circuit may be implemented by other ways such as, e.g., mounted on a mother board, installed in the housing of keyboard 111 or monitor 109, integrated with other circuitry of the computer system, or housed in a separate peripheral housing (not shown) that is either coupled to chassis 113 via cables or by wireless connection.

Also shown in FIG. 1 is an example of an identification object 110. Object 110 includes a transmitting circuit 121 for transmitting a wireless signal that contains identification information of an assigned possessor (107) of identification object 110. Such identification information may explicitly identify the assigned possessor or identify a group of the assigned possessor. In FIG. 1, object 110 is a security badge assigned to computer user 107. A security badge typically includes visual identification indication (not shown in FIG. 1) such as the possessor's name and/or picture. Also badges or other identification objects may also include a coded bar or magnetic stripe (not shown) that is readable by an infrared or optical scanner to allow the user to enter a restricted building or area of a building. Assigned possessors are typically required to possess an identification object at all times while they are in a restricted area. Consequently, a possessor may wear the badge around their neck (as shown in FIG. 1), wear the badge on a clip, or keep the badge in their pocket.

In order for user 107 to gain access to computer information by computer system 101, security object 110 must be within the transmitting range of circuit 121 from detection circuit 114 for detection circuit 114 to receive the wireless identification signal. When security object 110 is moved outside of the transmitting range of circuit 121 from detection circuit 114, access to the computer information is denied.

In some embodiments, computer system 101 utilizes the power management strategy of computer system 101 in controlling access to computer information. Power management strategies were developed by the computer industry to reduce the amount of power consumed by computer systems. Typically, power management strategies are utilized to shut down or turn off various devices and features of the computer system via hardware of software mechanisms when the computer system is not in use. An example of one power management strategy is the ADVANCED POWER MANAGEMENT (APM) Interface Specification, developed by INTEL™, and MICROSOFT™. Another is the ADVANCED CONFIGURATION AND POWER INTERFACE (ACPI) specification by INTEL™, MICROSOFT™, and TOSHIBA™. These specifications define power states at which the computer system may reside. The power states of a power management strategy typically range from the highest state, where the computer system is operating normally in an on power state such as where the computer system can process data, to the lowest state where the computer system is completely turned off. Various devices of the computer system are shut down and the system processor may not perform computations at lower intermediate power states. Such intermediate power states include the Standby, Suspend, and Hibernation power states for the APM specification and the Sleeping and Soft-off power states for ACPI specification. A further explanation of such power management strategies is found in U.S. patent application entitled "Prevention of Power State Change in Response to Chassis Intrusion," having a Ser. No. 09/322, 296, listed inventors Terry L. Matula and John R. Stuewe, a filing date of May 28, 1999, and a common assignee, which is hereby incorporated by reference in its entirety.

In one embodiment, computer system 101 will not transition to or be maintained in an operating power state unless detection circuit 114 receives a wireless identification signal containing identification information of an authorized user. When in an operating power state, if circuit 114 does not receive such an identification signal within a predetermined period of time (e.g., 15 seconds), execution of power management code of the operating system of computer system 101 places computer system 101 in a lower power state wherein a user can not access computer information. Also, if computer system 101 is in a soft off power state, then computer system 101 will not transition to an operating power state unless detection circuit 114 receives a wireless identification signal containing identification information of an authorized user.

In other embodiments, computer system 101 implements locked states and unlocked states to control access to computer information. In an unlocked state, a user has access to computer information accessible by computer system 101. In a locked state, a user does not have access to the computer information. Computer system 101 is in a locked or unlocked state depending upon whether detection circuit 114 is receiving a wireless identification signal containing identification information of an authorized user.

Access to the computer information in a locked state may be restricted by utilizing any of a number of conventional access restriction techniques. For example, some computer systems have the capability to restrict access to computer information located on a non volatile storage device of a computer system. An example of such a system is found in the patent application entitled "Portable Computer Systems With Hierarchical and Token-Based Security Policies," having a Ser. No. 09/237,016. For such systems, receipt of a wireless identification containing identification information of an authorized user may be required for access to the restricted information. Also, a wireless identification signal may contain other information needed for enabling access to restricted data. For example, the identification signal may contain decoding information for unscrambling data stored in a computer system that implements data encryption to restrict access.

With other computer systems, reception of an identification signal may be a prerequisite for the initiation or continuation of logon routines, either for the startup of a computer system or for logging on to a computer network. With these techniques, once access has been granted, a failure to receive an identification signal after a predetermined period of time may cause the user to be denied access to the computer information such as by automatically logging off a user or by placing the computer system in a lower power state. Those of skill in the art will recognize that based upon the teachings herein, utilizing a wireless identification signal containing identification information can be incorporated with other conventional security techniques for restricting access to computer information.

Also, because the detection circuit 114 may be used to discriminate among different users, other computer systems may utilize such information to restrict portions of computer information from different authorized users. For example, certain portions of information in a non volatile memory may be inaccessible to the employee assigned to the computer system but may be accessible to the organization's information systems department.

Figure 2:
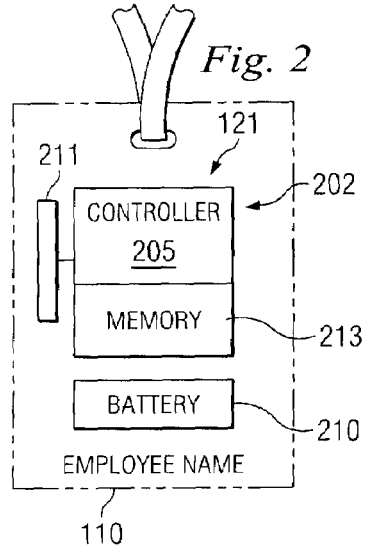
FIG. 2 is a perspective view of one example of an identification object that includes a block diagram of a transmitting circuit.

FIG. 2 shows one example of an identification object that includes a transmitting circuit. Transmitting circuit 121 is embedded in badge 110 with the outer dimensions of badge 110 shown in phantom on FIG. 2. Transmitting circuit 121 includes an integrated circuit chip 202 having a controller 205 and a memory circuit 213 for storing code that controller 205 executes for performing its operation. Transmitting circuit 121 also includes an embedded antennae 211 for broadcasting a wireless identification signal and an embedded battery 210 for power. Because battery 210 is embedded in FIG. 2, badge 110 is thrown away when battery 210 is fully discharged. However with other badges, the battery may be replaceable or rechargeable. Additionally, the transmitting circuit may be powered by other techniques such as with a solar cell. Other transmitting circuits may include other circuitry or may have other forms or configurations.

In one embodiment, transmitting circuit 121 transmits the identification signal as per a wireless protocol set forth in the Specification of the Bluetooth System, as provided by the "ad hoc SCATTERNET for affordable and highly functional wireless connectivity," v1.0A, Jul. 26th, 1999 (Bluetooth Specification). The Bluetooth Specification sets forth a short range radio link protocol that is broadcast in a band at 2.4 GHZ. The Bluetooth specification also sets forth the utilization of fast acknowledgment and frequency hopping schemes as well transmitting the information in packets. The transmitted signal is implemented using a shaped, binary frequency modulated signal. Typically, the specified range of a blue tooth transmitter is in the tens of feet. The identification signal may contain other information required under the Bluetooth Specification protocol such as addressing information.

The Bluetooth Specification is set forth as one example of a wireless protocol that may be utilized for transmitting an identification signal by transmitting circuit 121. Those of skill in the art will recognized that, based upon the teachings herein, a transmitting circuit may utilize other wireless protocols for transmitting the identification information and other information.

Figure 3:
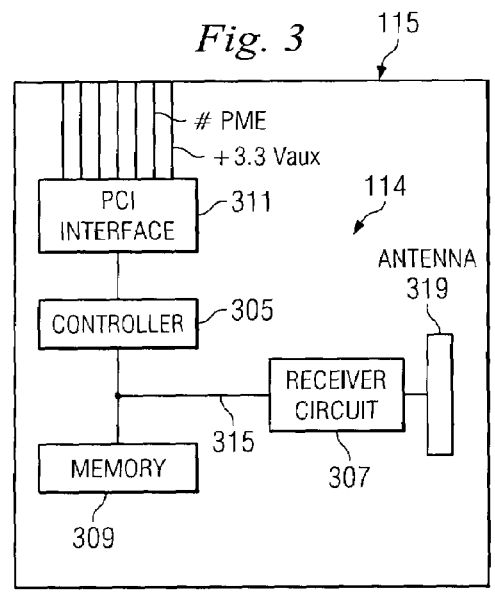
FIG. 3 is a block diagram of one example of a detection circuit.

FIG. 3 sets forth an example of a detection circuit. Detection circuit 114 is mounted on add-in card 115 that is inserted into a computer bus connector (see FIG. 4) to operably couple detection circuit 114 to system processor (402 in FIG. 4). Detection circuit 114 includes a controller 305, a receiver circuit 307, a memory circuit 309, and an antennae 319 for receiving an identification signal. Controller 305, receiver circuit 307, and memory circuit 309 are operably coupled together via bus 315. Detection circuit 114 also includes a bus interface circuit 311 which enables detection circuit 114 to be operably coupled to a computer bus. In FIG. 3, bus interface circuit 311 conforms to the PCI Local Bus Specification. Detection circuit 114 also includes I/O pins for providing an #PME signal and receiving a +3.3 Vaux signal which will be discussed later. Detection circuit 114 is powered by an auxiliary power supply (not shown) that provides power even when computer system 101 is in a soft off power state. Other detection circuits may have other forms or configurations. For example, some or all of the circuits of detection circuit 114 shown in FIG. 3 may be integrated on a single chip.

Receiver circuit 307 conforms to the wireless protocol (e.g., Bluetooth Specification) utilized by the transmitting circuit 121 in broadcasting the information signal. Receiver circuit 307 operates as per code stored in memory circuit 309, or with other systems, includes an integrated memory and performs operations according to the contents of its memory. Controller 305 executes code stored in memory circuit 309 to perform its operations.

In one embodiment, memory circuit 309 (or other memory circuit of detection circuit 114 such as a register) can be preprogrammed with a list of indications of authorized users. When receiver 307 receives an information signal, controller 305 compares the identification information in the received signal with the preprogrammed list stored in memory circuit 309 to determine if the information signal was sent by a transmitting circuit of an authorized user.

Figure 4:
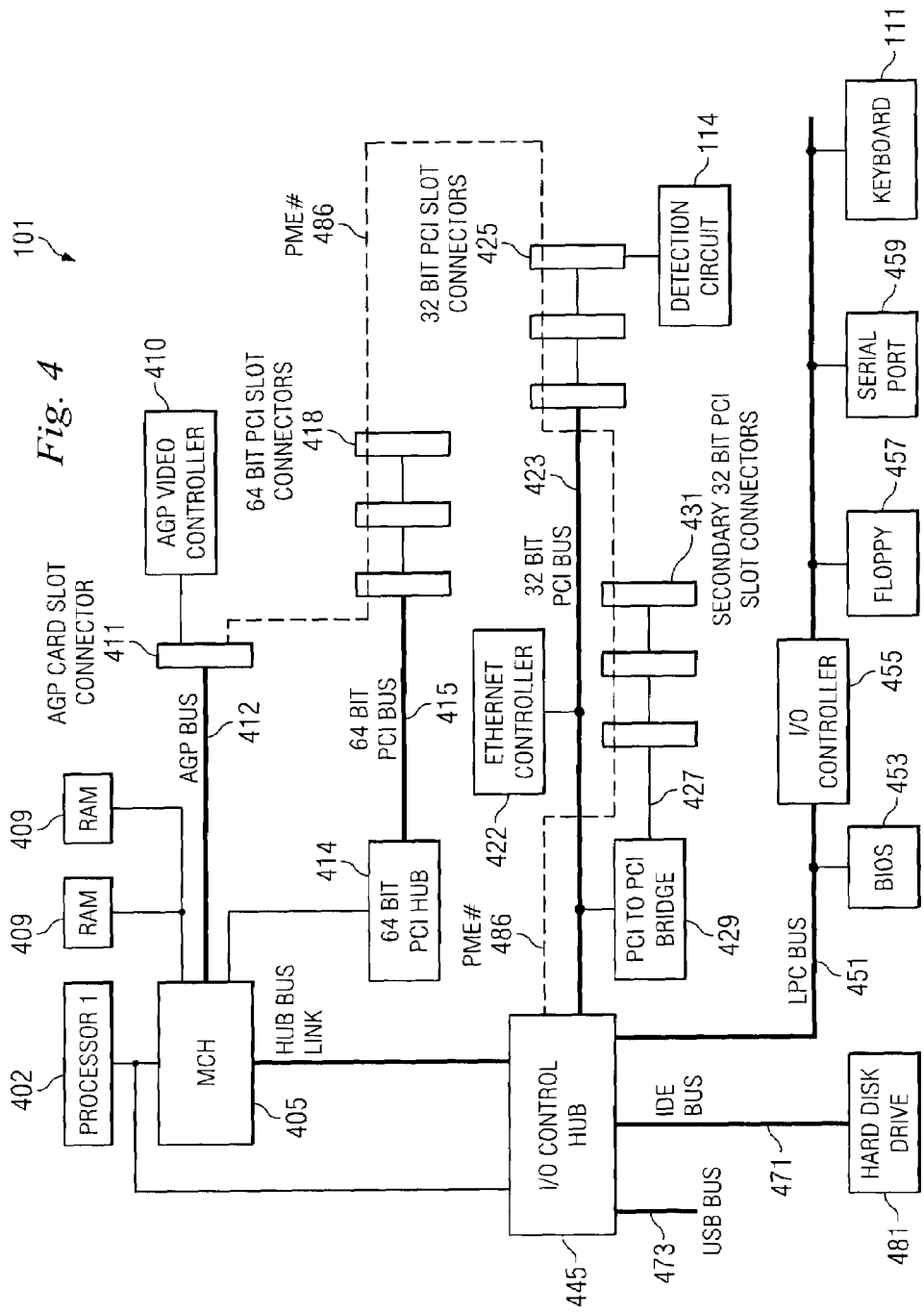
FIG. 4 is a block diagram of one example of a computer system.

FIG. 4 is a block diagram of computer system 101. Computer system 101 includes a system processor 402 such as, e.g., the PENTIUM III processor sold by INTEL™. RAM 409 is operably coupled to system processor 402 via a memory hub controller (MCH) 405, which in one embodiment is implemented with the 440BX chipset sold by INTEL™. A video controller 410 conforming to the Advanced Graphics Port Specification (AGP video controller) is mounted on a computer card (not shown) that is inserted into an AGP card slot connector 411 which is operably coupled to memory control hub 405 via AGP bus 412.

Computer system 101 includes a number of other computer busses conforming to various computer bus standards that enable system processor 402 to be operably coupled to multiple computer devices. Computer bus 415 is a 64 bit computer bus conforming to the Peripheral Component Interface (PCI) local bus specification, rev. 2.2. 64 bit PCI card slot connectors 418 are located on computer bus 415 and are operably coupled to memory controller hub 405 via a 64 bit PCI hub 414. Computer bus 423 is a 32 bit computer bus conforming to the PCI specification. Located on PCI computer bus 423 are PCI card slot connectors 425 and an ethernet controller 422 which is mounted on a system board (not shown). Computer bus 423 is operably coupled to system processor 402 via I/O control hub 445. I/O control hub 445 includes an integrated memory and performs operations according to the contents of its memory. In one embodiment, I/O control hub 445 is implemented with a PIIX4 chip sold by INTEL™. Computer system 101 also includes a secondary 32 bit PCI computer bus 427 operably coupled to computer bus 423 via a PCI-to-PCI bridge 429 with 32 bit PCI card slots 431 located on secondary bus 427. Detection circuit 114 is operably coupled to PCI bus 423 via one of card slot connectors 425. Other computer devices (not shown) may also be operably coupled to PCI busses 415, 423, and 427 including devices (not shown) located on computer cards inserted into card slot connectors 418, 425, and 431. Such devices include remote access circuits such as LAN connector circuits, modem circuits, and sound card circuits.

Computer system 101 also includes computer bus 451 which conforms to the Low Pin Count (LPC) bus standard. LPC computer bus 451 is operably coupled to computer system 101 via I/O control hub 445. Operably coupled to LPC computer bus 451 are BIOS ROM 453 and I/O controller 455. Operably coupled to the I/O controller 455 are a floppy disk drive 457, a serial port 459, and a keyboard 111. Computer system 101 also includes a computer bus 471 conforming to the Integrated Drive Electronics (IDE) standard and a computer bus 473 conforming to the Universal Serial Bus (USB) standard. A hard disk drive 481 is located on the IDE bus 471. Hard disk drive 481 stores application and operating system code. Other conventional computer devices (not shown) may be coupled via the computer busses and may be located either on computer cards or mounted to a system board of computer system 101.

Card slot connectors 411, 418, 425, and 431 each include a #PME terminal (not shown) for providing a #PME signal generated by the card circuit (not shown) located on a computer card that is inserted into a respective card slot connector. In FIG. 4, the #PME terminals for each of the card slot connectors 411, 418, 425, and 431 are electrically coupled together in a wired-OR configuration to an input of I/O Control Hub 445.

The power management event (#PME) power management signal as specified in the PCI Local Bus Specification, rev. 2.2 allows a device connected to the PCI bus to send a request to change the power state of the computer system such as to place the computer system in a working power state from another power state such as a sleeping power state or soft-off power state. The PCI Local Bus Specification, rev. 2.2 also specifies an auxiliary power signal referred to as +3.3 Vaux signal. The +3.3 Vaux signal is active even when the computer system is in a soft-off power state or in a sleeping power state. A bus conforming to the PCI Local Bus Specification, rev. 2.2 is a power managed computer bus in that devices coupled to the bus may receive auxiliary power and may assert signals to change the power state of the computer system even when the computer system is not in a working power state.

Figure 5:
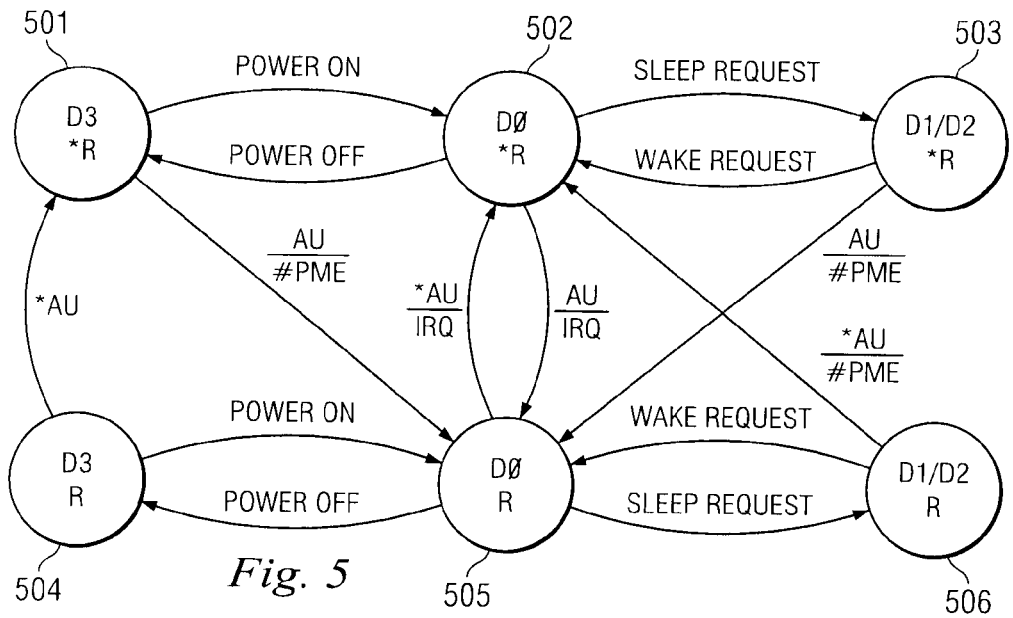
FIG. 5 is one example of a state diagram utilized in controlling access to computer information.

FIG. 5 is an example of state diagram utilized in controlling access to computer information by the use of a wireless identification signal from an authorized user. Referring back to FIG. 3, the state diagram is implemented by controller 305 executing code stored in memory 309. In one embodiment, transmitter circuit 121 periodically transmits the identification signal at a predetermined interval (e.g., every 5 seconds).

The state diagram of FIG. 5 includes two types of states, reception states and non reception states. The non reception states (states 501, 502, and 503) are designated with "*R", and the reception states (states 504, 505, and 506) are designated with "R". Controller 305 resides in states 501, 502, and 503 when detection circuit 114 has not received a wireless identification signal containing identification information of an authorized user for a predetermined period of time, and controller 305 resides in states 504, 505, and 506 when detection circuit 114 is receiving a wireless identification signal containing identification information of an authorized user.

In the embodiment of FIG. 5, controller 305 may reside in any one of four power states: full on (D0), two sleep states (D1 and D2), and soft off (D3). In the lower power states (D1, D2, and D3), detection circuit 114 receives power via an auxiliary power source (e.g., +3.3 Vaux) and is able to receive wireless identification signals and determine whether they contain identification information from an authorized user.

When in either a reception state (R) or a non reception state (*R), controller 305 transitions between a soft off D3 state (501 or 504) and a full on D1 state (502 or 505) via the placement of computer system 101 in a full on power state (S0) or a soft-off power state (S5). A transition to a full on D0 state from a soft off state D3 would occur, e.g., when I/O control hub 445 asserts a PS ON signal to the system power supply (not shown) to turn on all system voltages required for the full on power state. A transition to a soft off state D3 from a full on state D0 would occur, e.g., when I/O control hub 445 deasserts the PS_ON signal to turn off all non auxiliary system voltages such as in the soft-off power state.

In the embodiment of FIG. 5, controller 305 may also reside in sleeping power states (D1 and D2) in either a non reception state (503) or in a reception state (506). In these states (503 and 506) some of the functions of detection circuit 114 may not be enabled. Controller 305 is placed in the sleeping power states (D1/D2) from a full on power state (D0) by a sleep request generated by the operating system of computer system 101. Controller 305 is placed in the full on power state (D0) from the sleeping power states (D1/D2) by a wake request generated by the operating system of computer system 101. Sleep requests are generated by the operating system to reduce power if no activity is occurring within a period of time. In other embodiments, a state machine would not include states 503 or 506.

Initially, controller 305 resides in one of the non reception states (501, 502, or 503) where detection circuit 114 has not received a wireless identification signal from an authorized user for a predetermined period of time (e.g., 5 seconds). Controller 305 moves from one of the non reception states (501, 502 or 503) to reception state 505 when detection circuit 114 first receives an identification signal (e.g., when a user moves to within transmitter circuit 121's transmitting range of detection circuit 114) and determines that the identification signal is from an identifying object of an authorized user. Such an occurrence is designated by "AU" in FIG. 5. Depending on which non reception state (501, 502, or 503) controller 305 is transitioning from, controller 305 either asserts a #PME signal or generates an IRQ interrupt to initiate the placement of computer system 101 in an unlocked state (604 on FIG. 6) from a locked state (602 or 603 on FIG. 6) or a soft off state (601 on FIG. 6). For example, when controller 305 is in either non reception state 501 or non reception state 503, detection circuit 114 assert a #PME signal to initiate the placement of computer system 101 in unlocked state 604 from a locked state. If controller 305 is in state 502, then circuit 114 generates an IRQ interrupt to initiate the placement of computer system 101 in unlocked state 604 from locked state 602.

With some embodiments, detection circuit 114 may be required to receive multiple identification signals within a period of time (e.g., 15 seconds) from an identifying object of an authorized user before controller 305 transitions to reception state 505 from a non reception state (501, 502, or 503).

To remain in a reception state (504, 505, and 506), detection circuit 114 must continue to receive an identification signal from the authorized user's transmitting circuit within a predetermined period of time from a previously received signal. Such a condition would occur when a user remains in a location that is within transmitter circuit 121's range from computer system 101. In some embodiments, the predetermined period of time is greater than a multiple of the period of time between broadcasts by the transmitter circuit. For example, if transmitter circuit 121 transmits an identification signal every 5 seconds, detection circuit 114 would be required to receive an identification signal within 16 seconds (one second greater than three time periods) from the previously received signal. Thus, computer system 101 would not erroneously transition to a locked state (602 or 604) in response to missing one or two identification signals.

Controller 305 transitions to a no reception state (501 or 502) from a reception state (504, 505, and 506) when detection circuit 114 fails to receive an identification signal from the authorized user within the predetermined period of time (designated by "*AU" in FIG. 5). Depending on which reception state (504, 505, or 506) controller 305 is transitioning from, controller 305 either asserts a #PME signal or generates an IRQ interrupt to initiate the placement of computer system 101 in a locked state (602 or 603) from a unlocked state (604 or 605).

When in states 501 or 503, controller 305 transitions to state 505 in response to a receipt of an identification signal from the authorized user's transmitting circuit. When in state 506, controller 305 transitions to state 502 in response to a failure to receive an identification signal from the authorized user within a predetermined period of time.

Referring back to FIG. 3, with some embodiments, detection circuit 114 includes registers (not shown) that controller 305 writes an indication of what state (501–506) it resides in at that moment. These registers are readable by the system processor 402 or other circuits of the computer system (e.g., I/O control hub 445) for providing information to the circuit for placing the computer system in a locked or unlocked state. In some embodiments, detection circuit 114 also includes registers (not shown) in which controller 305 writes an indication of the users from which it has received or it is currently receiving an identification signal.

Figure 6:
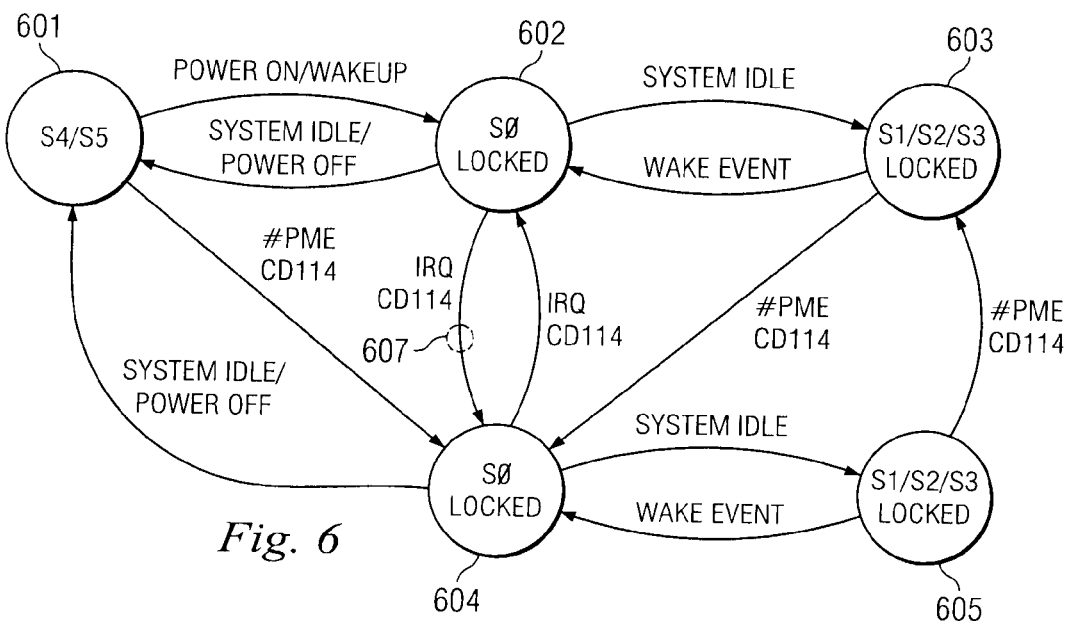
FIG. 6 is one example of a state diagram utilized in controlling access to computer information.

FIG. 6 is an example of a state diagram implemented by the operating system of computer system 101 for controlling access to computer information accessible by computer system 101. In state 601, the computer system is in a soft-off power state (S5) or a suspend hibernation sleep power state (S4). Computer system 101 may also reside in locked states 602 and 603 and unlocked states 604 and 605. When computer system 101 resides in locked states 602 and 603, a user is denied access to computer information accessible by computer system 101 via conventional access restriction security techniques. For example, a user may be logged off of the system when computer system 101 transitions to a locked state (602 or 603). When computer system 101 is in an unlocked state (604 or 605), a user has access to computer information accessible by computer system 101.

When in state 601, computer system 101 transitions to a full on locked state 602 in response to either a wakeup event such as a remote wake-on LAN signal or a power on event such as when a user pushes the on switch when detection circuit 114 is not receiving an identification signal from an authorized user. Referring back to FIG. 5, when computer system 101 is in locked state 602, if controller 305 is in state 501, the operating system places controller 305 in state 502 (See FIG. 5).

Referring back to FIG. 6, when in either full on state (602 or 604), computer system 101 transitions to sleeping states 603 or 605 in response to a system idle event such as a predetermined period of inactivity. Referring back to FIG. 5, when computer system 101 is placed in state 603 or 605, the operating system places controller 305 in either state 503 or 506 from state 502 or 505, respectively.

Referring back FIG. 6, computer system 101 transitions to states 602 or 604 (the full on power states (S0)) from states 603 or 605 respectively in response to a wake up event such as a user interface action or the receipt of a remote wake-on LAN signal. When computer system 101 transitions from state 603 or 605 to state 602 or 604, respectively, the operating system places controller 305 in state 502 or 505, respectively from state 503 or 506, respectively.

Referring back to FIG. 6, when computer system 101 is in state 601 or in state 603, an assertion of a #PME signal by detection circuit 114 (designated as "#PME CD114" in FIG. 6) places computer system 101 in the full on, unlocked state 604. Such a condition may occur when computer system 101 is in state 601 or 603 and a user brings a transmitting circuit (e.g., circuit 121) into the transmitting circuit's range of detection circuit 114. At such time, controller 305 transitions to state 505 from either state 501 (if computer system 101 is in state 601) or state 503 (if computer system 101 is in state 603), and detection circuit 114 asserts the #PME signal.

In the embodiment shown, when computer system is in a locked, full on state 602, computer system 101 transitions to a full on, unlocked state 604 in response to receiving an IRQ interrupt generated by detection circuit 114 (designated "IRQ CD114") when controller 305 transitions to state 505 in response to detection circuit 114 receiving an identification signal from an authorized user. In the unlocked state 604, a user has access to computer information accessible by computer system 101.

When computer system is in unlocked state 604, computer system 101 transitions to a full on, locked state 602 in response to receiving an IRQ interrupt generated by detection circuit 114 when controller 305 transitions to state 502 in response to a failure of detection circuit 114 to receive an identification signal from the authorized user within a predetermined period of time.

When in an unlocked sleeping state 605, computer system 101 transitions to locked state 603 in response to an assertion of the #PME signal by detection circuit 114 when controller 305 transitions to state 502 from state 506.

In other embodiments, computer system 101 implements the use of a password to grant access to computer information. In this alternative embodiment, computer system 101 would only transition to unlocked state 604 from locked sleep state 603 or power off state 601 via locked state 602. In this alternative embodiment when in locked state 602, computer system 101 would transition to a "password routine" state 607 (shown in phantom in FIG. 6) in response to receiving an IRQ interrupt generated by detection circuit 114. When a user supplies the proper password, computer system 101 would transition to unlocked state 604 from password routine state 607.

Other computer systems according to the present disclosure may implement state diagrams having other configurations.

In response to receiving a #PME signal, I/O control hub 445 initiates the placement of computer system 101 in a working power state. The operations that I/O control hub 445 perform to initiate the placement of computer system 101 in the working power state depend upon which lower power state computer system 101 resides. Such conventional operations are set forth in the ACPI specification and in the PCI local bus specification, rev. 2.2. Those of skill in the art will appreciate that, based upon the teachings herein, numerous other techniques may be implemented for placing a computer system in a working power state from a lower power state in response to receiving a #PME signal. For example, other controllers of computer system 101 (e.g., I/O control hub 445) may be utilized in changing the power state of computer system 101. In one such system, detection circuit 114 would provide the state (501–506) of controller 305 to hub 445 via a side band signal.

In response to a generation of an IRQ interrupt, the operating system of computer system 101 invokes an interrupt routine that determines that the interrupt was generated by detection circuit 114. The interrupt routine also places computer system 101 in the appropriate locked state 602 or unlocked state 604. For those computer systems that require an authorized user to provide a password before having access to the computer information, the interrupt routine would invoke a logon routine that displays a prompt on monitor 109 for the user to provide a password. The user would be granted access to the computer information if the user provides the correct password that corresponds to the identification information received from transmitting circuit 121.

Those of skill in the art will recognize that, based upon the teachings herein, several additional modifications may be made to the embodiments shown in FIGS. 1–6 and described herein. For example, with other computer systems, the detection circuit may be operably coupled to a system processor via a computer bus conforming to other computer bus standards including other computer bus standards that are power managed such as the USB standard. Also, at least some of the state diagram of FIG. 5 may be implemented in other controllers of a computer system (such as e.g., I/O control hub 445) or in the system processor. With such systems, the detection circuit would provide a signal every time that an identification signal from a transmitting circuit of an authorized user is received. Also with other systems, at least some of the state diagram of FIG. 6 may be implemented in other controllers of a computer system (such as e.g., I/O control hub 445). With other systems, some of the receiver circuit operations, such as demodulating the transmitting signal may be performed by other controllers or by the system processor. Still in other systems, the detection circuit may include a transmitter capable of transmitting information to transmitting circuits of identifying objects. With such systems, the detection circuit transmits commands to the transmitting circuit of the identifying object to alter or adjust the transmitting of the identification signal by the transmitting circuit of the identifying object. With other systems, the controller and memory of a transmitting circuit or of an identification detection circuit may be integrated such as e.g., in an application specific integrated circuit (ASIC) chip.

While particular embodiments of the present disclosure have been shown and described, it will be recognized to those skilled in the art that, based upon the teachings herein, further changes and modifications may be made without departing from this disclosure and its broader aspects, and thus, the appended claims are to encompass within their scope all such changes and modifications.

What is claimed is:

1. A system comprising:
   a multipurpose authorized user identification device providing physical access to a premesis and access to a computer system on the premesis;
   at least one processor coupled to the computer system;
   a first Bluetooth device provided on the identification device providing a communication capability with a second Bluetooth device provided in the computer system including a non-line-of-sight proximity range actuated identification signal detection circuit for receiving a wireless identification signal from the identification device, the wireless identification signal containing identification information regarding one or more users of the device;
   a memory having means for determining whether the user of the identification device as indicated by the wireless identification signal, has authorized access to computer information accessible by the computer system;
   means for maintaining the computer system in a low power state except when the user identification device is in the proximity range; and
   means for granting and maintaining access to computer information accessible by the computer system if it is determined that the user as indicated by the wireless identification signal is authorized access and remains in the proximity range, wherein the granting access to computer information accessible by the computer system further includes placing the computer system in a higher power state from the lower power state.

2. The system of claim 1 further comprising:
   a memory circuit programmable to store a list of at least one user having authorized access to computer information assessable by the computer system.

3. The system of claim 1 wherein placing the computer system in a condition to deny further includes logging a user off of the computer system in response to the identification signal detection circuit not having received for a predetermined period of time, a wireless identification signal containing identification information from the user having authorized access.

4. The system of claim 1 wherein placing the computer system in a condition to deny further includes placing the computer system in a locked state in response to the identification signal detection circuit not having received for a predetermined period of time, a wireless identification signal containing identification information from the user having authorized access.

5. The system of claim 1 further comprising:
   a memory circuit storing operating system code whose execution by the at least one processor implements an operating system for controlling the operation of the computer system; and
   wherein the operating system code includes code whose execution places the computer system in a condition to deny access to computer information accessible by the computer system in response to the identification signal detection circuit not having received for a predetermined period of time, a wireless identification signal containing identification information from the user having authorized access.

6. The system of claim 1 wherein:

the memory having means for determining that the identification signal detection circuit has not received the wireless identification signal for a predetermined period of time is implemented in the identification signal detection circuit; and the identification signal detection circuit provides a response signal in response to a determination that the identification signal detection circuit has not received for a predetermined period of time, a wireless identification signal containing identification information from the user having authorized access.

7. The system of claim 6 wherein the identification signal detection circuit generates an interrupt in response to a determination that the identification signal detection circuit has not received the wireless identification signal for a predetermined period of time.

8. The system of claim 6 wherein the identification signal detection circuit asserts a #PME signal in response to a determination that the identification signal detection circuit has not received the wireless identification signal for a predetermined period of time.

9. The system of claim 8 further comprising:

a chipset circuit having an input to receive the #PME signal from the identification signal detection circuit.

10. The system of claim 1 wherein the memory having means for determining whether the user of the device and the memory having means for determining that the identification signal detection circuit has not received the wireless identification signal for a predetermined period of time, are both implemented in the same memory circuit of the identification circuit.

11. The system of claim 1 wherein the identification signal detection circuit is operably coupled to a power managed computer bus.

12. The system of claim 1 wherein:

the identification signal detection circuit has an output to provide an indication signal indicating that the identification signal detection circuit has received a wireless identification signal containing identification information of the user of the device determined to have authorized access; and wherein the indication signal is provided in response to receiving a wireless identification signal containing identification information of the user of the device determined to have authorized access after a predetermined period of time of not receiving an identification signal containing identification information of the user of the device determined to have authorized access.

13. The system of claim 12 wherein:

the identification signal detection circuit is operably coupled to the at least one processor via a computer bus substantially conforming to a PCI Local Bus Specification; and the indication signal includes an assertion of the #PME signal.

14. The system of claim 1 further comprising:

a memory having means for placing the computer system in a higher power state from a lower power state if it is determined that the identification signal detection circuit has received a wireless identification signal containing identification information of the user having authorized access.

15. A method for controlling access to computer information comprising:

providing a multipurpose authorized user identification device for physical access to a premesis and access to a computer system on the premesis;

providing a computer system;

providing a first Bluetooth device provided on the identification device providing a communication capability with a second Bluetooth device provided in the computer system including determining whether the user as indicated by the wireless identification signal has authorized access to computer information accessible by the computer system;

maintaining the computer system in a low power state except when the user identification device is in the proximity range; and granting and maintaining access to computer information accessible by the computer system if it is determined that the user as indicated by the wireless identification signal is authorized access and remains in the proximity range, wherein the granting access to computer information accessible by the computer system further includes placing the computer system in a higher power state from the lower power state.

* * * * *